Sept. 17, 1957  A. F. A. BARTELS  2,806,245
DEVICE FOR SKINNING FISH FILLETS
Filed July 20, 1953  3 Sheets-Sheet 1

INVENTOR.
ALFRED F. A. BARTELS
BY
Richards & Geier
ATTORNEYS

Sept. 17, 1957   A. F. A. BARTELS   2,806,245
DEVICE FOR SKINNING FISH FILLETS
Filed July 20, 1953                3 Sheets-Sheet 2

INVENTOR.
ALFRED F. A. BARTELS
BY
Richards & Geier
ATTORNEYS

INVENTOR
ALFRED F. A. BARTELS
BY Richards & Geier
ATTORNEYS

United States Patent Office 2,806,245
Patented Sept. 17, 1957

2,806,245

DEVICE FOR SKINNING FISH FILLETS

Alfred Friedrich Adolf Bartels, Lubeck, Germany, assignor to Nordischer Maschinenbau Rud. Baader, Lubeck, Germany Application July 20, 1953, Serial No. 369,168

Claims priority, application Germany January 21, 1953

3 Claims. (Cl. 17—4)

This invention relates to a device for skinning fish fillets.

Known skinning devices of this type have the drawback that a large part of the flesh at the tail of the flesh remains on the skin.

It is an object of the instant invention to provide a skinning device which avoids losses of flesh as compared with known similar devices.

Other objects of the instant invention will become apparent in the course of the following specification.

In the attainment of the aforesaid objectives, a construction is provided wherein a connecting wheel is supported in a rocker arm under the action of a return spring. The rocker arm imparts a swinging movement to the skinning knife from the position of rest into the cutting position and from the cutting position into the position of rest. Lever means move the knife from the position of rest to the cutting position while spring means returns the knife from the cutting position to the position of rest.

The invention will appear more clearly from the following detailed description when taken with the accompanying drawings showing by way of example a preferred embodiment of the inventive concept.

Figure 1:
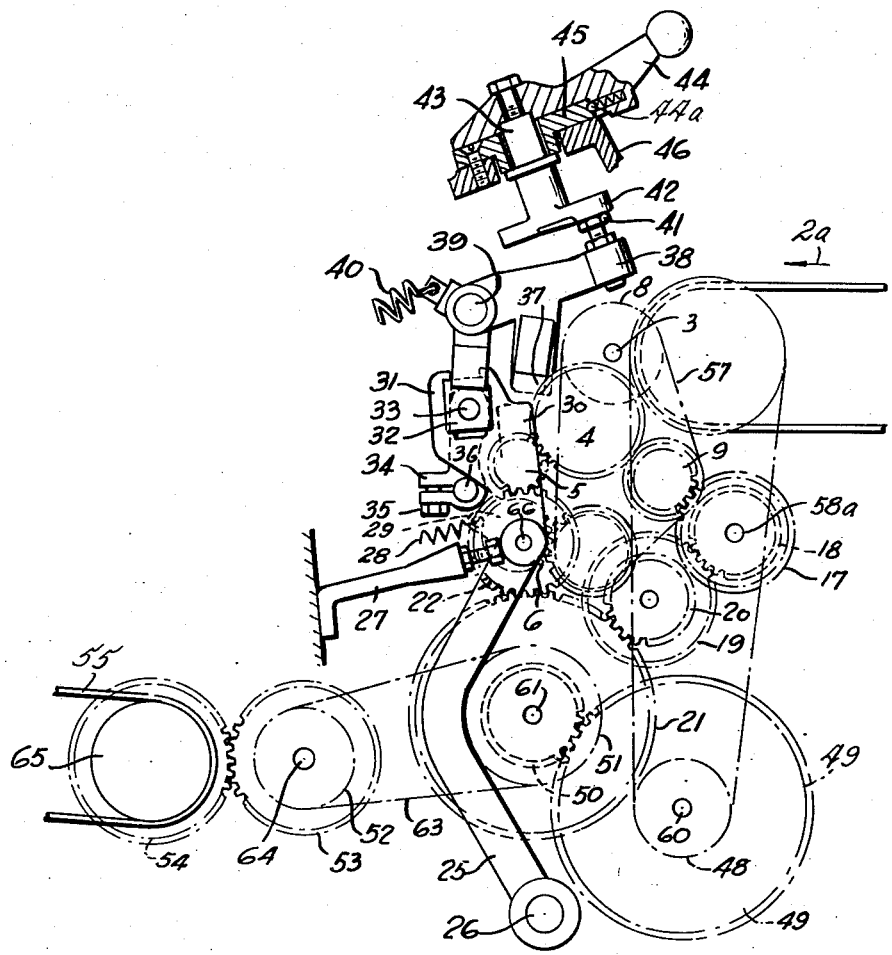
Figure 1 is a schematic elevational view of the device constructed in accordance with the principles of this invention.
Figure 2:
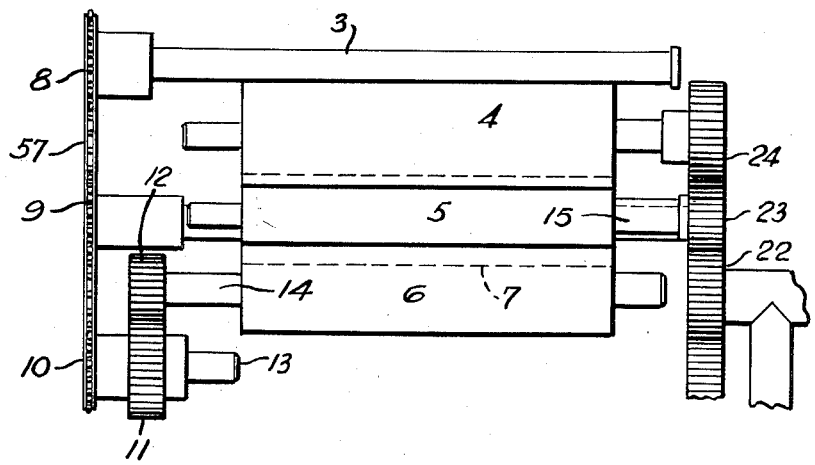
Figure 2 is a schematic plan view of the device shown in Figure 1.
Figure 3:
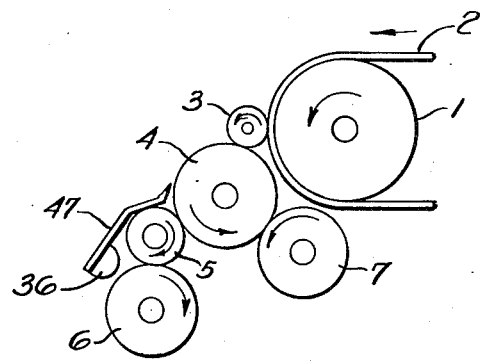
Figure 3 is a fragmentary view of the device shown in Figure 1.
Figure 4:
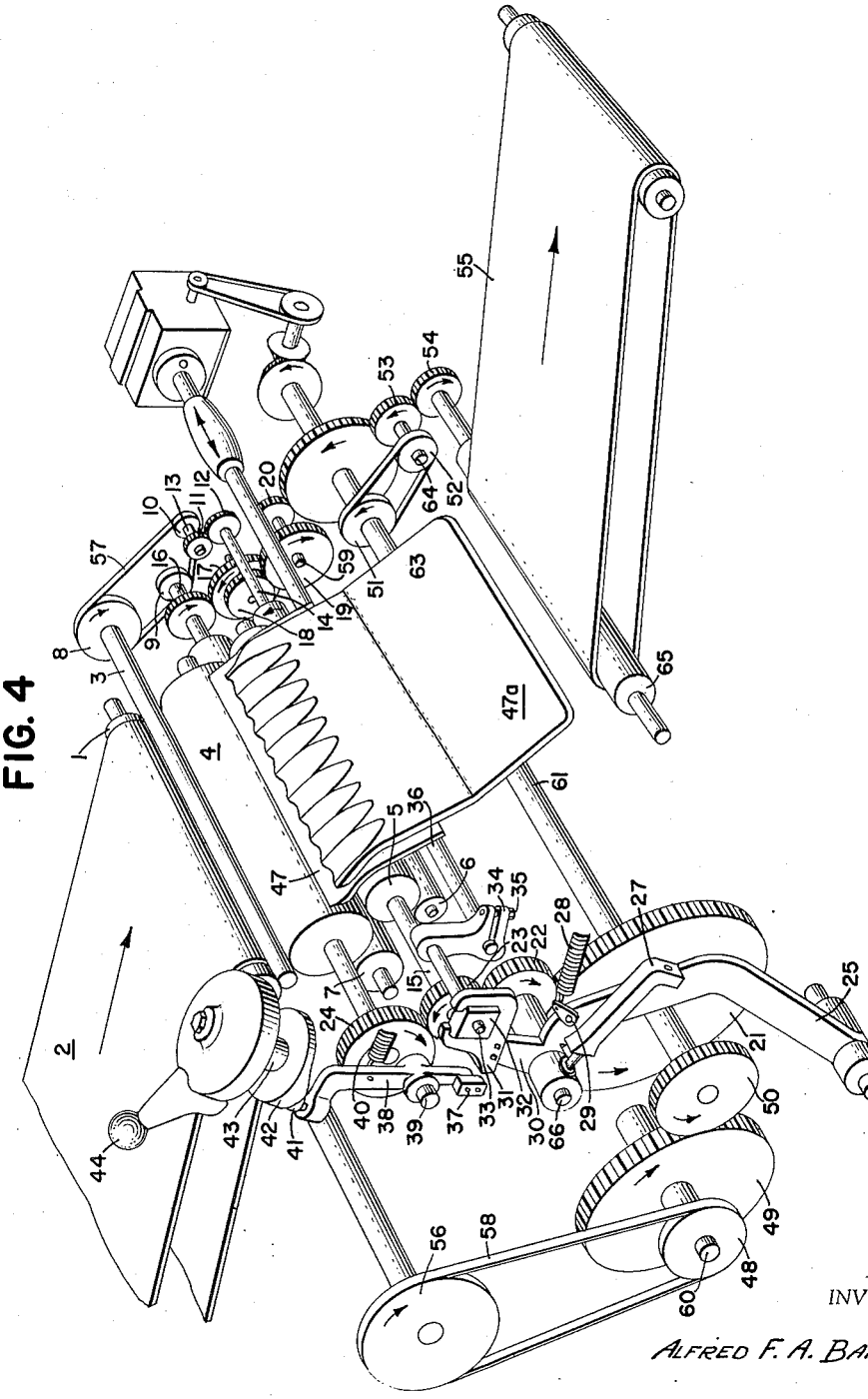
Figure 4 is a perspective view of the device shown in Fig. 1.

In the drawings, 1 is the driving roller for the feeding belt 2, 3 a transmission or transfer roller, 4 the skinning roller, 5 the clamping roller, and 6 and 7 the stripping rollers. When the transmission roller 3 is operated by a motor (not shown), the sprocket wheel 8 drives the sprocket wheels 9 and 10 by means of the chain 57. The sprocket wheel 10 is rigidly connected with the spur wheel 11 and rotates with the latter on the pin 13. The spur gear 11 drives the spur gear 12 which, with the front stripping roller, is rigidly attached to the shaft 14. The sprocket wheel 9 with the rear stripping roller 7 and the spur wheel 16 is rigidly attached to the shaft 15. The spur wheel 16 is engaged with the spur wheel 17 which is attached to the spur wheel 18 and together with the latter, is rotatably supported on the pin 58. The spur gear 18 is in mesh with the spur gear 19 which is attached to the spur gear 20 and rotated with the latter on the pin 59. The large intermediate wheel 21 which is rigidly connected with the spur wheel 50 and the sprocket wheel 51 is driven by the spur wheel 20. The spur wheel 49 which driven by the spur wheel 50 rotates on the pin 60 and drives the sprocket wheel 56 and the belt roller 1 by means of the sprocket wheel 48 and the chain 58a. The sprocket wheel 51 and the chain 63 drive the sprocket wheel 52 which rotates on the pin 64 along with the spur gear 53; the spur wheel 54 on the driving roller 65 of the discharge belt 55 supplies the drive for the fillet discharge belt.

The large spur wheel 21 is also in gear with the spur wheel 22 which drives the spur wheel 23 together with the clamping roller 5 and, simultaneously, drives the spur wheel 24 and the skinning roller 4. The speeds of the rollers 1, 3, 4, 5, and 65 are carefully adjusted to one another in order to obtain maximum preservation of the fillet with maximum output.

The spur gear 22, which is the connection wheel, is supported by means of the pin 66 on the connecting rocker arm 25 which swings around the pin 26, and, by means of the tension spring 28 is held against the adjustable stop 27. The spring action of the spring 28 can be adjusted by means of a spring shackle 29 swingable around the pin 66.

The connecting rocker 25 is connected at its upper end 30 with a sliding piece 31 which carries the sliding block 32. The knife carrier 36 which carries the skinning knife 47, also carries a lever 34 which is tightened to the knife carrier 36 by means of a hexagonal nut 35. The lever 34 is supported with its connecting pin 33 in the sliding block 32 and, when taken along by the latter upon a movement of the connecting lever 25, determines the position of the skinning knife. Any suitable drive for the oscillating movement of the skinning knife may be used (not shown).

In order to limit the deflection of the connecting rocker arm 25 in a clockwise direction, there is provided a stop 37 which is attached to the stop lever 38 swingable around the pin 39. The position of the stop 37 can be adjusted by means of the stop screw 41 which is held against the curve 42 by means of the spring 40. The curve 42 is rotatably supported by means of the bolt 43 and is rigidly connected with the adjusting lever 44. Due to the provision of a spring loaded ball 44a in the adjusting lever 44, the latter can be immobilized in any desired position with respect to the supporting flange 45 attached to the gear housing 46. In this way, it is possible to adjust over the curve 42 the distance of the knife 47 from the skinning roller 4 corresponding to the particular thickness of the skin of the fillets in any case.

In operation: The fish fillets arrive in close succession in the direction of the arrow 2a (Fig. 1) on the feeding belt 2 with the skin side on the belt and with the tail end at the front. The transfer roller 3 takes them off the feeding belt 2 and transfers them to the skinning roller 4. The end of the fillet follows the periphery of the skinning roller 4 and enters the gap between the rollers 4 and 5. At this point, the blade of the skinning knife, depending on the adjustment, is at a distance of 8 to 16 mm. from the circumference of the skinning roller. When entering between the rollers 4 and 5, the tip of the fillet causes a retardation in the speed of rotation of the clamping roller 5. Because of this retardation, the connecting wheel 22 deviates in the direction of rotation of the large spur wheel 21 thereby displacing the connecting lever 25 in the same direction against the action of the spring 28. This displacement takes place until the sliding piece 31 limits the movement by hitting the stop 37. During this turning operation, the sliding block 32 guided in the sliding part 31 via the connecting pin 33 has moved the lever 34 and thereby the skinning knife 47 close to the skinning roller 4. In this action, the flesh of the fish is cut close behind the outer end of the tail. The skin pulled through between the rollers 4 and 5 causes the movement of the fillet against the skinning knife 47 and across it with the maximum preservation of the flesh of the fish. Upon the termination of the skinning process, the resistance between the two rollers 4 and 5 disappears, the connecting wheel 22 with the connecting rocker arm 25 is brought again into the starting position in engagement with the stop 27 by means of the spring 28, thereupon the next skinning operation can start.

These swinging operations follow each other in each case in less than one one-hundredth of a second so that the succession of operation is very close while the loss of flesh is at a minimum.

While there is disclosed and described only one embodiment of subject skinning device, other embodiments are possible within the scope of the appended claims.

What is claimed is:

1. In a device for skinning fish fillets, a skinning roller, a clamping roller cooperating with said skinning roller, a rocker arm located adjacent said clamping roller, a pivot supporting one end of said rocker arm, a spur wheel connected with skinning roller and rotatable therewith, another spur wheel connected with the clamping roller and meshing with the first-mentioned spur wheel, a third spur wheel carried by said rocker arm and meshing with said other spur wheel, an intermediate gear wheel meshing with the third spur wheel, whereby a fillet projected between the skinning roller and the clamping roller causes a retardation of the clamping roller and thereby causes the rocker arm and the third spur wheel to deviate in the direction of said intermediate gear wheel, a spring connected with said rocker arm and opposed to the direction of said deviation, a skinning knife, means swingably connecting said skinning knife with said rocker arm, and means cooperating with the last-mentioned means for limiting the deviating movement of the rocker arm.

2. In a device for skinning fish fillets, a skinning roller, a clamping roller cooperating with said skinning roller, a rocker arm located adjacent said clamping roller, a pivot supporting one end of said rocker arm, a spur wheel connected with skinning roller and rotatable therewith, another spur wheel connected with the clamping roller and meshing with the first-mentioned spur wheel, a third spur wheel carried by said rocker arm and meshing with said other spur wheel, an intermediate gear wheel meshing with the third spur wheel, whereby a fillet projected between the skinning roller and the clamping roller causes a retardation of the clamping roller and thereby causes the rocker arm and the third spur wheel to deviate in the direction of said intermediate gear wheel, a spring connected with said rocker arm and opposed to the direction of said deviation, a sliding piece carried by the free end of said rocker arm, a sliding block slidably mounted in said sliding piece, a knife carrier connected with said sliding block, a skinning knife carried by said knife carrier, and a stop adapted to be engaged by said sliding piece to limit the deviating movement of said rocker arm.

3. In a device for skinning fish fillets, a skinning roller, a clamping roller cooperating with said skinning roller, a rocker arm located adjacent said clamping roller, a pivot supporting one end of said rocker arm, a spur wheel connected with skinning roller and rotatable therewith, another spur wheel connected with the clamping roller and meshing with the first-mentioned spur wheel, a third spur wheel carried by said rocker arm and meshing with said other spur wheel, an intermediate gear wheel meshing with the third spur wheel, whereby a fillet projected between the skinning roller and the clamping roller causes a retardation of the clamping roller and thereby causes the rocker arm and the third spur wheel to deviate in the direction of said intermediate gear wheel, a spring connected with said rocker arm and opposed to the direction of said deviation, a sliding piece carried by the free end of said rocker arm, a sliding block slidably mounted in said sliding piece, a knife carrier connected with said sliding block, a skinning knife carried by said knife carrier, a stop adapted to be engaged by said sliding piece to limit the deviating movement of said rocker arm, a stop lever connected with said stop, a stop screw carried by said stop lever, and a rotatable curve engaging said stop screw, whereby the position of the stop can be adjusted.

References Cited in the file of this patent

UNITED STATES PATENTS

| | | |
|---|---|---|
| 2,215,114 | Baader et al. | Sept. 17, 1940 |
| 2,455,831 | Townsend | Dec. 7, 1948 |
| 2,522,728 | Townsend | Sept. 19, 1950 |
| 2,605,495 | Daniels | Aug. 5, 1952 |

FOREIGN PATENTS

| | | |
|---|---|---|
| 636,371 | Great Britain | Apr. 26, 1950 |